Nov. 10, 1959   C. RABIN   2,911,755
TRAP NET
Filed Sept. 30, 1958

Charles Rabin
INVENTOR.

United States Patent Office 2,911,755
Patented Nov. 10, 1959

2,911,755

TRAP NET

Charles Rabin, Metaire, La.

Application September 30, 1958, Serial No. 764,319

3 Claims. (Cl. 43—105)

The present invention generally relates to a trap net and more particularly to such a net especially adapted for catching shrimp or crabs.

In current practice of catching crab or shrimp, a meshed container having an open top is lowered into the water with bait being provided in the container and such containers are raised at certain intervals for inspection to see if any crab or shrimp are disposed therein. While a considerable number of crabs and shrimp are caught in this manner, the same is not as efficient as it should be since quite often the catch is lost while the container is being raised to the top of the water. Therefore, it is the primary object of the present invention to provide a device which is closed when lowered into the water and will open when the same rests upon the bottom of the body of water with the bait revealed and will subsequently be closed around the catch when the net is raised thus preventing any possible loss of the catch as it is being raised to the upper surface of the water.

Another object of the present invention is to provide a trap net generally in the form of an annular ring member foldable about a transverse axis together with a lift string attached to diametrically opposed points on the ring and in 90° relation to the axis of folding whereby the ring will be folded into a pouch-like member when the attached string is raised.

A further important object of the present invention is to provide a trap net which is extremely simple in construction, effective in operation, easy to use, well intended for its particular purposes and relatively inexpensive to manufacture.

These together with other objects and advantages which will become subsequently apparent reside in the details of construction and operation as more fully hereinafter described and claimed, reference being had to the accompanying drawing forming a part hereof, wherein like numerals refer to like parts throughout and in which:

Figure 1:
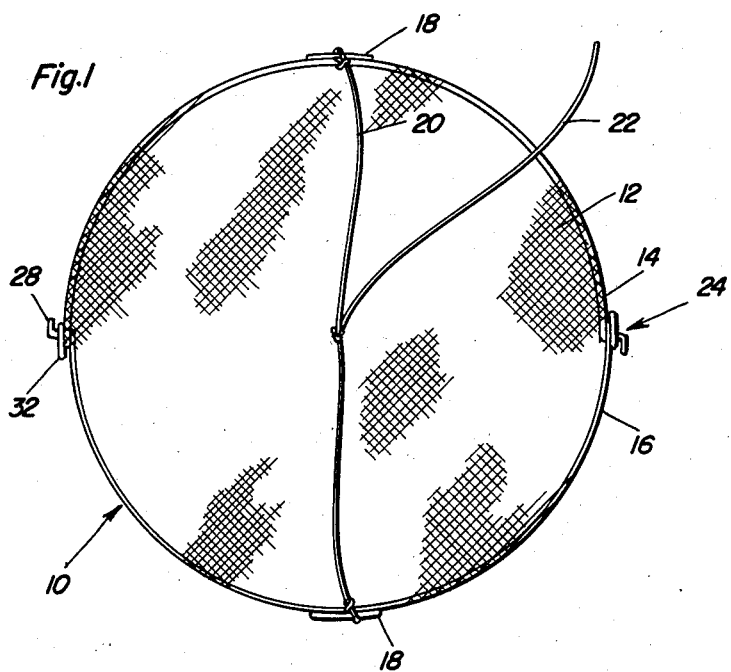
Figure 1 is a plan view of the trap net of the present invention shown in unfolded condition ready for use.
Figure 3:
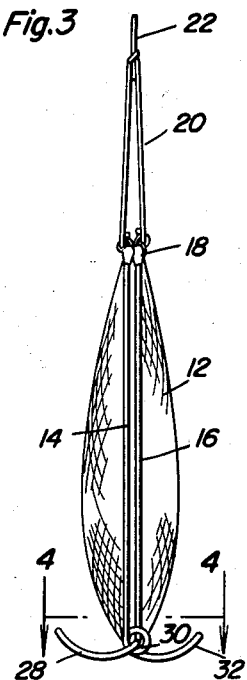
Figure 3 is a side elevational view of the device showing the same in folded condition which it assumes when raising or lowering.

Referring now specifically to the drawings, the numeral 10 generally designates the trap net of the present invention which includes an enlarged meshed member of flexible material such as twine netting designated by the numeral 12 with the twine netting 12 being connected with a pair of semi-circular rings 14 and 16 which coact to form an annular ring. Each of the semi-circular members 14 and 16 is provided with a weight 18 in the center thereof and a yoke in the form of a string 20 is attached to the ring members 14 and 16 at the point of attachment of the weight 18 and a lift string 22 is attached to the center of the yoke string 20 for raising and lowering the members 14 and 16 with the netting 12 attached thereto. The free ends of the members 14 and 16 are interconnected by hinge means generally designated by the numeral 24 which allows the semi-circular members 14 and 16 to fold to a condition alongside of each other when tension is exerted on the yoke 20 generally as illustrated in Figure 3 whereby any crab or shrimp disposed on the top surface of the netting 12 will be retained therein when the trap net is being raised to the surface of the water from the bottom of the water.

Figure 2:
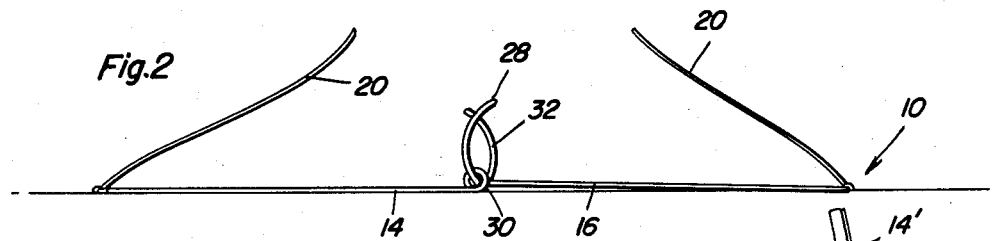
Figure 2 is a side elevational view of the construction of Figure 1.
Figure 4:
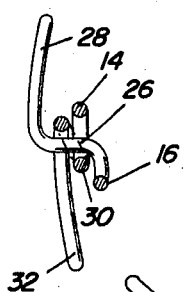
Figure 4 is a detailed sectional view taken substantially upon a plane passing along section line 4—4 of Figure 3 illustrating the details of construction of the hinge members and arcuate feet thereon.
Figure 5:
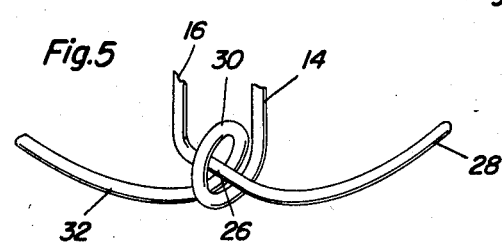
Figure 5 is an exploded group perspective view of one of the hinge members.

The hinge means 24 includes a lateral offset 26 on one end of the member 16 and an arcuate extension 28 on the free end of the lateral extension 26 with the arcuate extension 28 having a convex lower end and curving generally in the opposite direction to the member 16 and being substantially perpendicular thereto as clearly shown in Figure 2 of the drawings. The adjacent end of the member 14 is provided with a wire loop 30 encircling the laterally offset portion 26 and a curved extension 32 similar to the extension 28 and extending in the opposite direction in relation thereto and generally in perpendicular relation to the plane of the member 16. One end of the member 16 is identical to one end of the member 14 with the identical members being orientated in diametrically opposed relation. This orientation of structure is shown in Figure 3 thus hingedly connecting the semi-circular members 14 and 16 together for hinged movement thereof about the transverse axis defined by the lateral offset portions.

In using the device, the netting 12 is laid down on a supporting surface and the semi-circular members 14 and 16 folded downwardly. A piece of bait is then tied into or anchored to the center of the netting 12 in any suitable manner and the string 22 is then lifted for lifting the device and lowering the same down into the water. During the lowering operation and any time the weight of the device is supported by the string 22, the semi-circular ring members 14 and 16 will be held in adjacent position as illustrated in Figure 3 and the extensions 28 and 32 which form arcuate feet extend laterally outwardly in opposite directions as illustrated in Figure 3. When the device reaches the bottom of the body of water, the extensions and especially the convex lower surfaces thereof will engage the bottom surface thus tending to pivot the members 14 and 16 outwardly inasmuch as the arcuate sections 32 and 28 are rigid with the respective members. Also to facilitate the downward and outward pivotal movement of the central portions of the semi-circular members 14 and 16, the weight 18 increases the speed of opening of the annular ring which will expose the bait to the sea life desired to be caught. After a predetermined length of time, the lift line 22 is lifted and the semi-circular ring members 14 and 16 will be disposed in adjacent relation to each other thus completely enclosing the articles to be caught within the netting and preventing escape thereof. By using a small mesh netting, the device may be used in catching shrimp as well as crabs.

Figure 6:
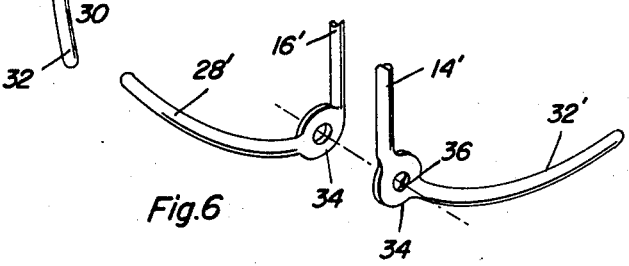
Figure 6 is an exploded group perspective view of a modified form of hinge.
Figure 7:
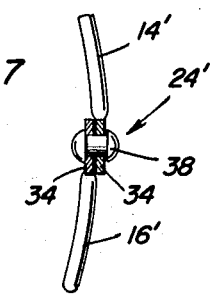
Figure 7 is a sectional view illustrating in detail the hinge construction of Figure 6.

Figures 6 and 7 illustrate a modified form of hinge generally designated by the numeral 24' in which the members 14' and 16' are each provided with a flattened area 34 disposed in overlying relation and provided with an aperture 36 therethrough for receiving a rivet or fastener 38. Each of the sections 14' and 16' are provided with the extensions 28' and 32' thereon forming the feet for opening the elements 14' and 16'.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A trap net comprising a pair of semi-circular wire members, means hingedly connecting the free ends of said wire members thereby forming a ring member with the ring member being collapsible about a transverse axis, a netting attached to said ring member, and a lift yoke of flexible material attached to said ring member in 90° relation to the transverse folding axis whereby upward force exerted on the yoke will cause the semi-circular wire members to pivot to a position alongside of each other thereby enclosing material resting on the netting, each end of each semi-circular wire member being provided with an arcuate extension forming a convex foot with the extension disposed generally in perpendicular relation to the plane of the semi-circular wire member for engaging a supporting surface when the folded wire members are lowered thus urging the wire members outwardly into coplanar relation thereby exposing the net and bait mounted thereon.

2. A trap net comprising a pair of semi-circular wire members, means hingedly connecting the free ends of said wire members thereby forming a ring member with the ring member being collapsible about a transverse axis, a netting attached to said ring member, and a lift yoke of flexible material attached to said ring member in 90° relation to the transverse folding axis whereby upward force exerted on the yoke will cause the semi-circular wire members to pivot to a position alongside of each other thereby enclosing material resting on the netting, said hinge means including a wire loop formed on one end of each semi-circular wire member and a lateral extension formed on the other end of each wire member with the lateral extensions being received in the loop for hingedly connecting the wire members together.

3. A trap net comprising a pair of semi-circular wire members, means hingedly connecting the free ends of said wire members thereby forming a ring member with the ring member being collapsible about a transverse axis, a netting attached to said ring member, and a lift yoke of flexible material attached to said ring member in 90° relation to the transverse folding axis whereby upward force exerted on the yoke will cause the semi-circular wire members to pivot to a position alongside of each other thereby enclosing material resting on the netting, said hinge means including a flattened portion on each of said semi-circular wire members, each flattened portion having an aperture therethrough with the flattened portions being disposed against each other, and a fastening member extending through the aperture and retaining the flattened portions in pivotal overlying relation to each other thereby hingedly connecting the semi-circular wire members together.

References Cited in the file of this patent

UNITED STATES PATENTS

| 424,548 | Franklin | Apr. 1, 1890 |

FOREIGN PATENTS

| 24,348 | France | Feb. 14, 1922 |